(12) United States Patent
Derrick et al.

(10) Patent No.: US 10,857,884 B2
(45) Date of Patent: Dec. 8, 2020

(54) VISUAL DISPLAY UNIT FOR A STEERING WHEEL ASSEMBLY

(71) Applicant: Key Safety Systems, Inc., Sterling Heights, MI (US)

(72) Inventors: John-Oliver Derrick, Nauheim (DE); John Musiol, West Bloomfield, MI (US); Brandon Marriott, Commerce Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/207,324

(22) Filed: Dec. 3, 2018

(65) Prior Publication Data

US 2020/0171947 A1     Jun. 4, 2020

(51) Int. Cl.
| | |
|---|---|
| *B60K 35/00* | (2006.01) |
| *G06F 3/041* | (2006.01) |
| *G06F 3/14* | (2006.01) |
| *B60R 21/203* | (2006.01) |
| *B62D 1/04* | (2006.01) |

(52) U.S. Cl.
CPC ............ *B60K 35/00* (2013.01); *B60R 21/203* (2013.01); *B62D 1/04* (2013.01); *G06F 3/041* (2013.01); *G06F 3/14* (2013.01); *B60K 2370/1438* (2019.05); *B60K 2370/52* (2019.05); *B60K 2370/782* (2019.05)

(58) Field of Classification Search
CPC ... B60R 21/203; B60R 21/2165; B60R 11/02; B60K 35/00
See application file for complete search history.

(56) References Cited

U.S. PATENT DOCUMENTS

| | | | |
|---|---|---|---|
| 9,552,148 B2* | 1/2017 | Kim .................. | B62D 1/046 |
| 10,583,855 B2* | 3/2020 | Toddenroth .......... | B60R 21/215 |
| 2013/0147847 A1* | 6/2013 | Koseki ............... | B60R 11/0235 |
| | | | 345/660 |
| 2016/0001807 A1* | 1/2016 | Hans .................... | B62D 1/046 |
| | | | 345/173 |
| 2018/0086297 A1* | 3/2018 | Bodtker ................ | B60K 35/00 |

* cited by examiner

*Primary Examiner* — Michael A Faragalla
(74) *Attorney, Agent, or Firm* — Meunier Carlin & Curfman LLC

(57) ABSTRACT

A visual display unit configured to mount on a steering wheel assembly has a screen display, preferably a touch screen display. The screen display is mounted over an airbag module of the steering wheel assembly. A hinged structure holds the screen display to the steering wheel assembly. The hinged structure is configured to be pivotally attached to a center portion of the steering wheel assembly and non-obstructively movable upon deployment of an airbag. The visual display unit can be a computer or video monitor for occupant viewing while traveling in an autonomous vehicle. The visual display unit includes driver alerts activated by the autonomous vehicle. The visual display unit preferably includes vehicle instrumentation gauges, satellite navigation system, speed, temperature and other data displays.

15 Claims, 5 Drawing Sheets

VISUAL DISPLAY UNIT FOR A STEERING WHEEL ASSEMBLY

FIELD OF THE INVENTION

The present invention relates to a visual display unit for an automobile generally, more specifically for a steering wheel assembly.

BACKGROUND OF THE INVENTION

Historically, most vehicle accessory controls and radio volume and tuning knobs or buttons were located on the dash. More recently, vehicles have adopted the steering wheel as a preferred place to position switches and controls such as speed or cruise control, radio controls and display menu switches. In this configuration, all the instrument gauges are still shown in the display area of the instrument panel.

In new vehicle designs, the use of a center or central mounted driver side airbag module affixed to a hub of a steering wheel has been found a very desirable safety feature. As this space in the center of the steering wheel is needed for the deployment of an airbag, the use of the space has been avoided for controls. One exception being horn activation by pushing the airbag module into horn switches to sound a horn.

These driver side airbags often have covers that tear along a seam line to allow the airbag to inflate and to deploy between a rim of the steering wheel and the driver. This space between the driver and the vehicle needs to be unobstructed for proper airbag deployment.

The present invention provides a unique way to use this space above a driver side airbag module.

SUMMARY OF THE INVENTION

A visual display unit configured to mount on a steering wheel assembly has a screen display, preferably a touch screen display. The screen display is mounted over an airbag module of the steering wheel assembly. A hinged structure holds the screen display to the steering wheel assembly. The hinged structure is configured to be pivotally attached to a center portion of the steering wheel assembly on or adjacent the airbag module and non-obstructively movable upon deployment of an airbag. The visual display unit can be a computer or video monitor for occupant viewing while traveling in an autonomous vehicle. The visual display unit includes driver alerts activated when used with autonomous vehicles. The visual display unit preferably includes vehicle instrumentation gauges, satellite navigation system, speed, temperature and other data displays. In one embodiment, the visual display unit employs an auto-rotate feature that keeps the display image or view level or horizontal regardless of the movements of the steering wheel. A gravity sensor unit seamlessly keeps the screen display image level.

In a preferred embodiment, the visual display unit is combined with a steering wheel assembly. The steering wheel assembly has a rotatable rim and a non-rotatable mounting assembly, an airbag module and the visual display unit. The rotatable rim is affixed to a center armature attached to a steering shaft configured to steer a vehicle. The non-rotatable mounting assembly is positioned spaced from and within a perimeter defined by the rotatable rim. The airbag module is mounted onto and forms a part of the non-rotatable mounting assembly configured to deploy an inflatable airbag cushion between the rim and an occupant. The visual display unit is mounted to the non-rotatable mounting assembly and positioned within the perimeter of the rim. Upon deployment of the airbag cushion, the visual display unit does not impede the airbag cushion deployment. The visual display unit moves during an airbag cushion deployment.

In a preferred embodiment, the visual display unit is attached to a hinged structure configured to pivot about said airbag module during deployment. Alternatively, the visual display unit can be attached to a cover affixed to the airbag module, wherein the airbag module has the cover open on deployment and the visual display unit moves with the cover. The cover has a frangible opening that tears on deployment and the visual display unit is stationary and affixed to a portion of the cover removed from the frangible opening. The frangible opening of the cover is positioned along an upper portion or lower portion of the airbag module defined as centered at 12:00 o'clock or 6:00 o'clock position where 12:00 o'clock is an upper position and 6:00 o'clock is a lower position relative to the steering wheel assembly. Preferably, the visual display unit has a touch screen for controlling the visual display unit. The visual display unit can have either a rigid display or a flexible touch screen display either directly affixed to or adjacent and above the airbag module. The visual display unit is tiltably adjustable at a viewer's discretion. The visual display unit is positioned relative to the rotatable rim above, at or below a plane defined by the perimeter of the rotatable rim.

The steering wheel assembly has the rotatable rim spaced a distance from the airbag module and visual display unit to facilitate hand grip along 360 degrees of the perimeter of the rotatable rim. The steering wheel assembly with the visual display unit can be part of an autonomous vehicle drive system. The visual display unit can broadcast incoming calls, text messages and video including satellite navigation systems along with a complete array of instrument gauges available on demand.

BRIEF DESCRIPTION OF THE DRAWINGS

The invention will be described by way of example and with reference to the accompanying drawings in which.

DETAILED DESCRIPTION OF THE INVENTION

Figure 1:
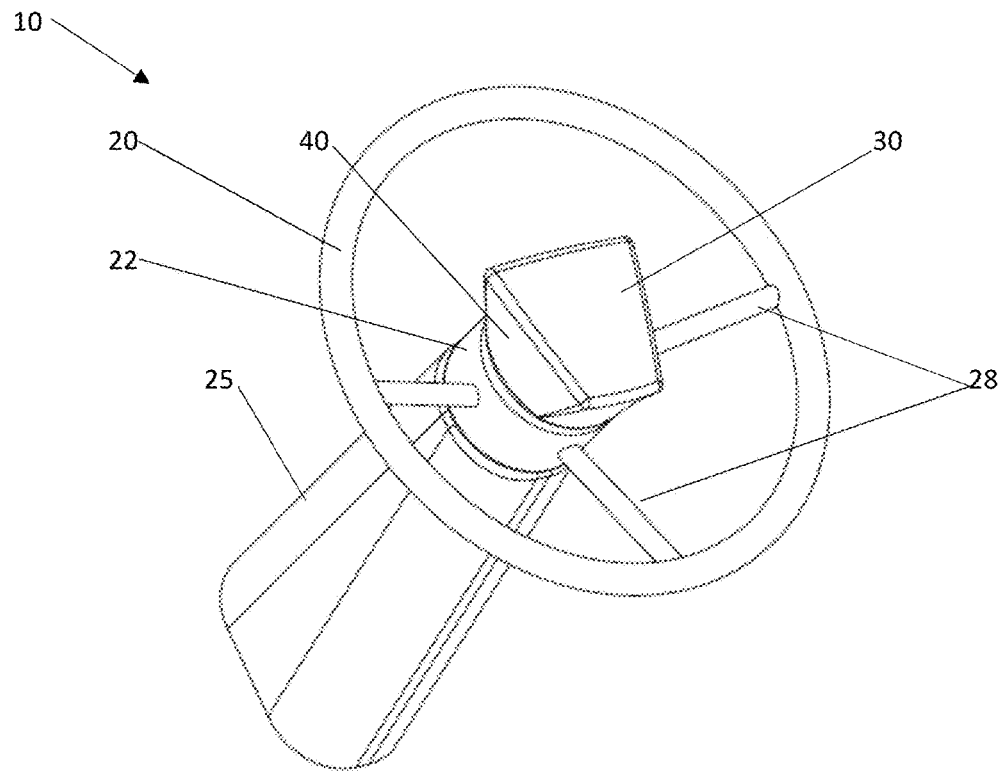
FIG. 1 is a perspective view of a steering wheel assembly with a visual display shown mounted above an airbag module.
Figure 2:
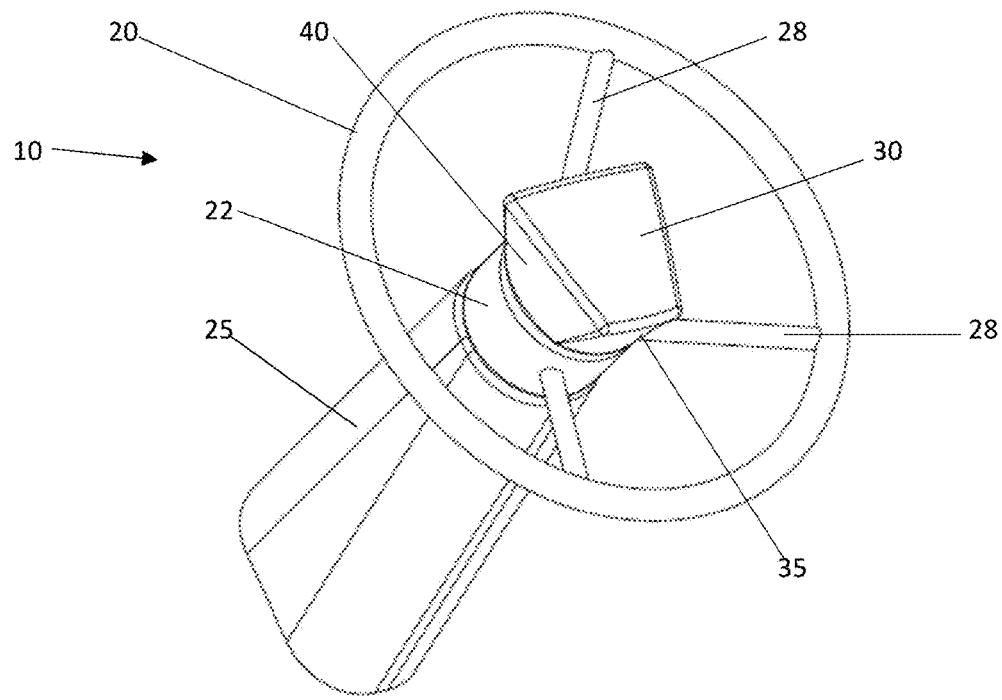
FIG. 2 is a view taken from FIG. 1 wherein the rim of the steering wheel assembly has been rotated about 30 degrees in a counter clockwise direction while the visual display is shown fixed.

With reference to FIGS. 1 and 2, a first embodiment of the present invention is shown. In this embodiment, a steering wheel assembly 10 is illustrated. The steering wheel assembly 10 has a rotatable rim 20 that is attached via spokes 28 to a central steering shaft or hub 22. Below the steering shaft 22 is illustrated a non-rotatable center portion 25. Attached to an end of the non-rotatable center portion 25 is an airbag module 40 with a visual display unit 30 shown directly above the airbag module 40.

With reference to FIG. 1, the rotatable rim 20 is shown in an orientation where the spokes 28 are approximately at 3, 6 and 9 o'clock positions. In FIG. 2, the rim 20 has been rotated counterclockwise wherein the spokes 28 have been moved to approximately 1, 4 and 7 o'clock positions. While it is observed that the visual display unit 30 affixed to the airbag module 40 has not rotated and is maintained in the same position relative to the vehicle orientation despite the rotation of the rim 20. This embodiment illustrates that a visual display unit 30 can be centrally positioned on a non-rotatable center portion of a steering wheel assembly 10. In such a fashion, the display gauges and other features can be shown on the steering wheel assembly 10.

Figure 3:
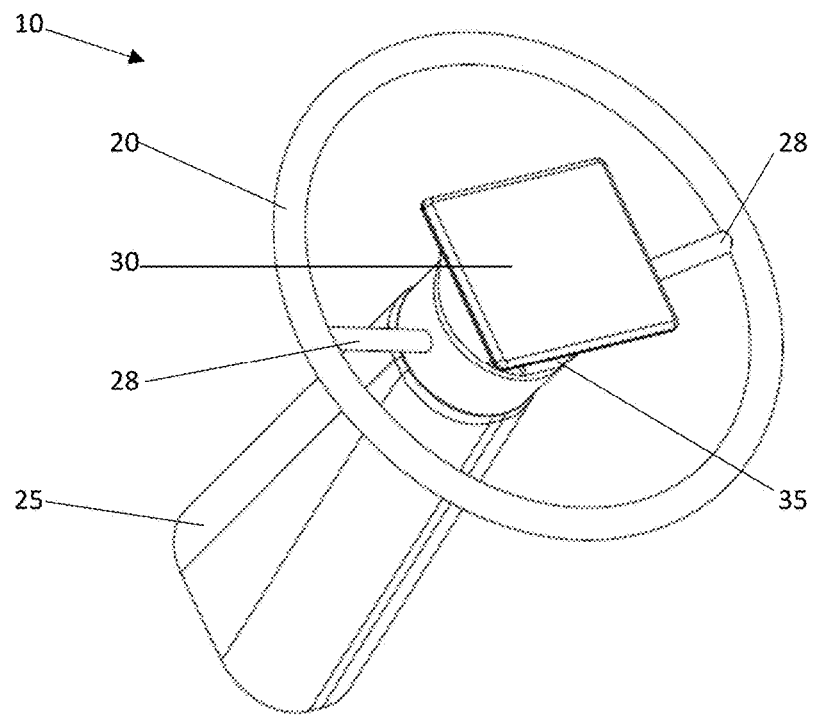
FIG. 3 is an alternative embodiment of the visual display unit affixed to a steering wheel assembly in a flat orientation relative to the rim.
Figure 4:
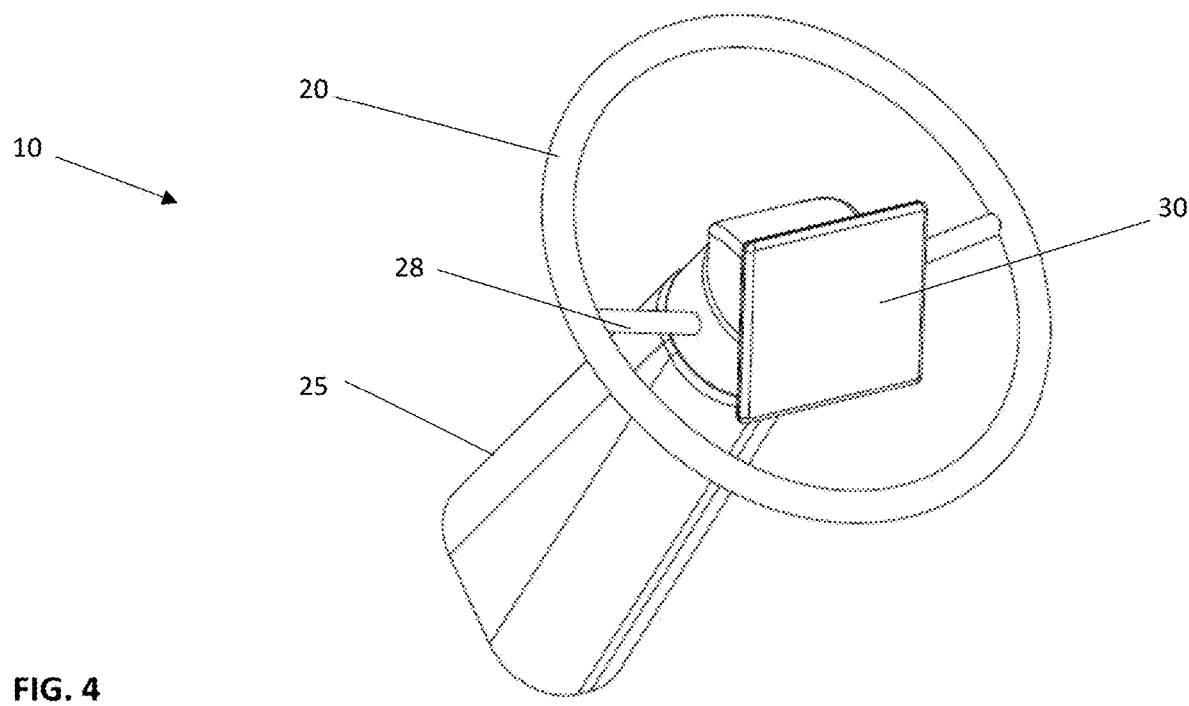
FIG. 4 is the same embodiment from FIG. 3 of the alternative embodiment with the display tilted slightly relative to the rim.
Figure 5:
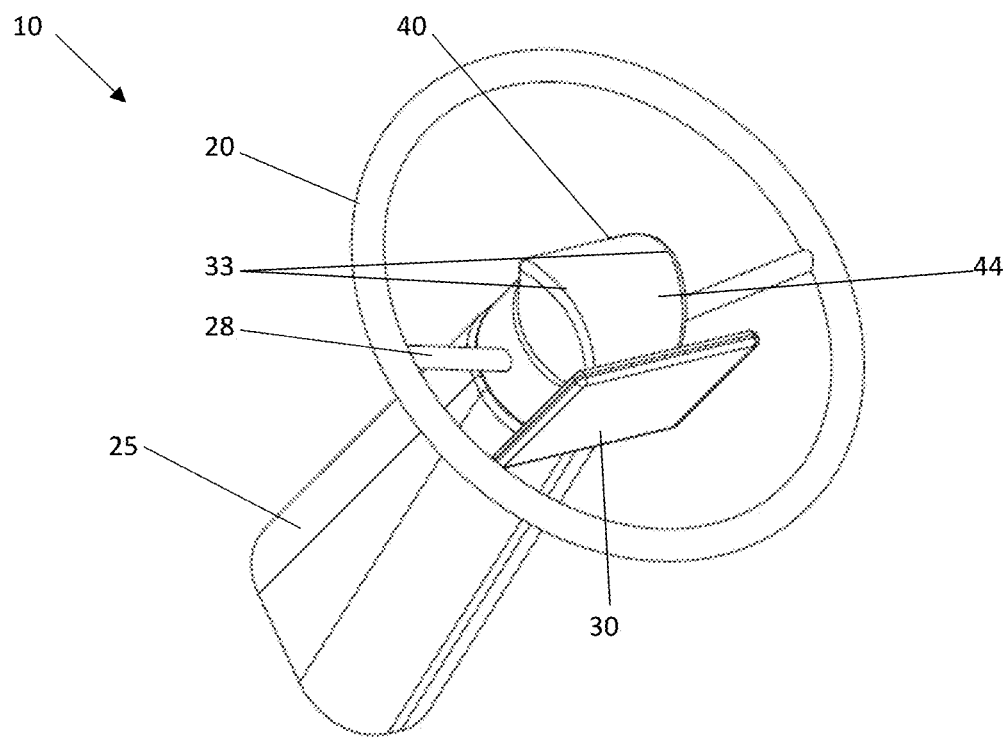
FIG. 5 shows the visual display of FIGS. 3 and 4 rotated almost 90 degrees relative to an airbag module exposing the cover for deployment.
Figure 6:
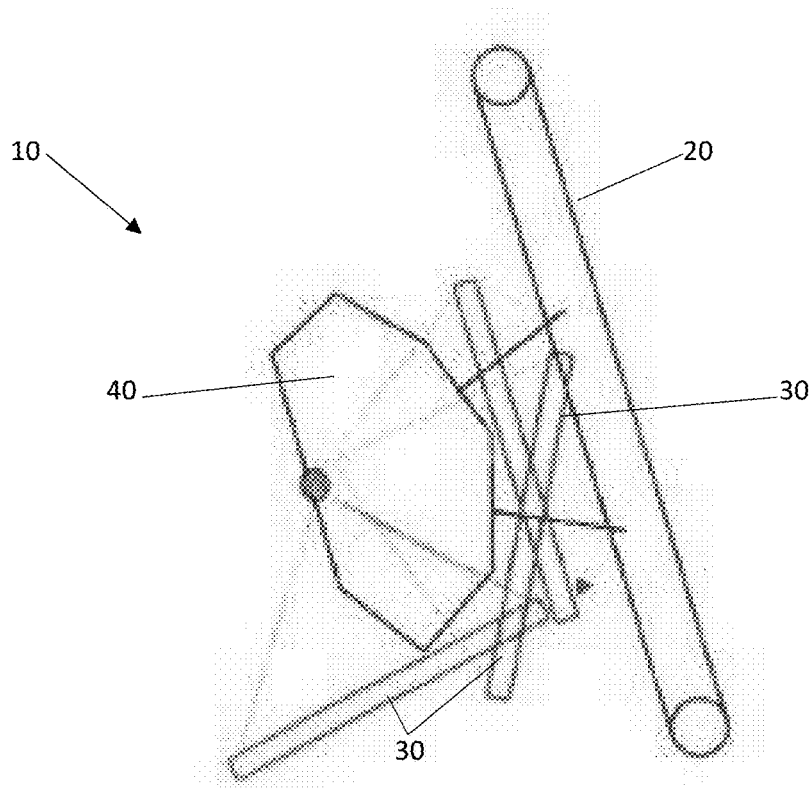
FIG. 6 is a schematic side view of the visual display unit showing the relative position of FIGS. 3, 4 and 5 respectively.
Figure 7:
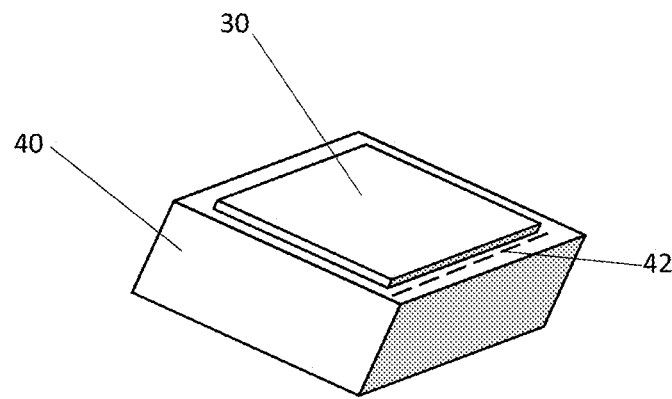
FIG. 7 shows a visual display unit affixed to a portion of an airbag module cover that separates on deployment of the airbag.
Figure 8:
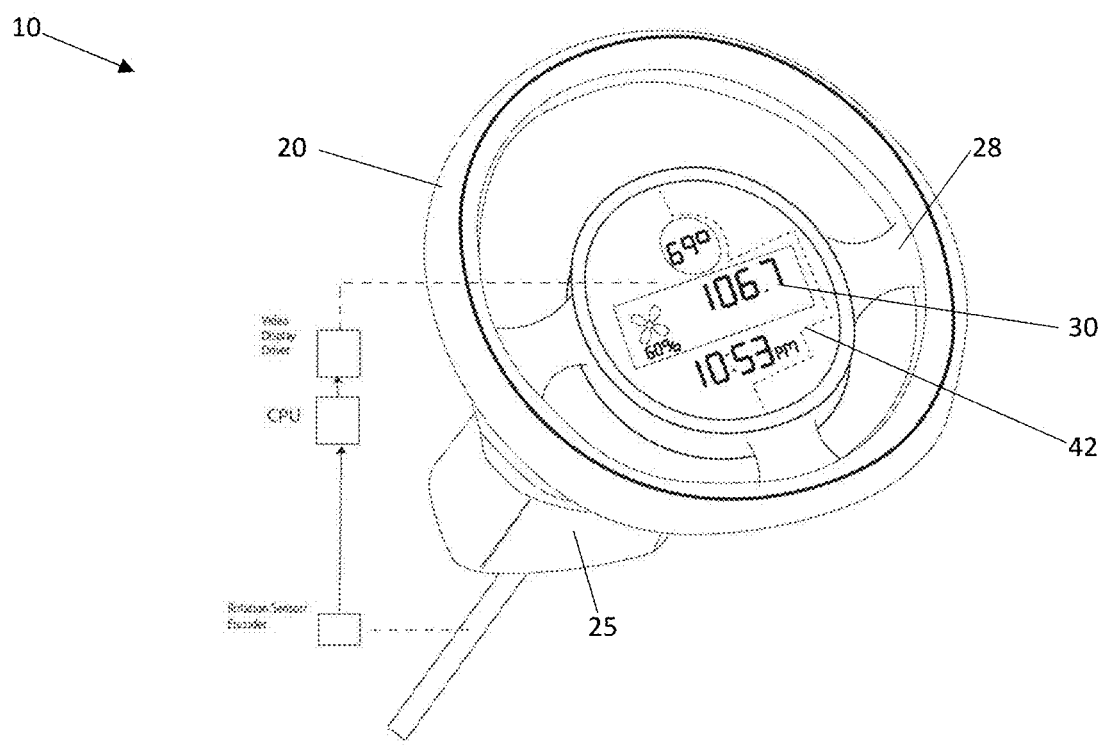
FIGS. 8 and 9 are examples of an alternative embodiment showing a set of visual display units on an airbag module cover.
Figure 9:
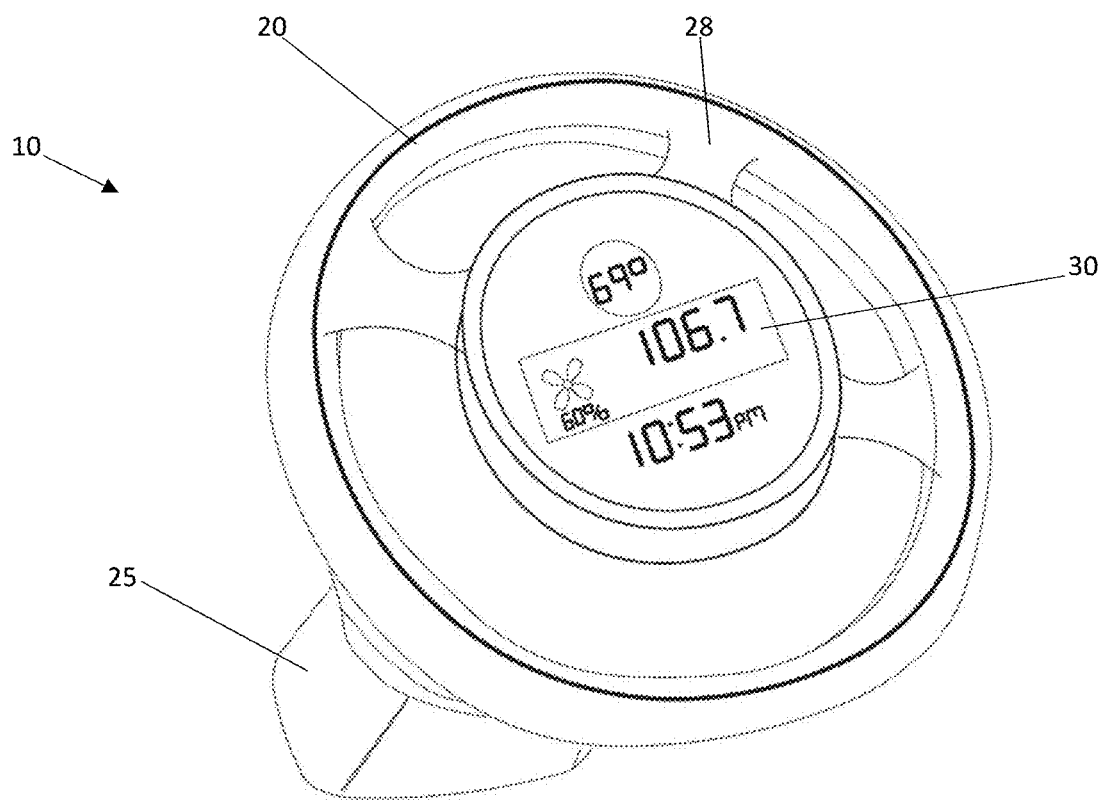

With reference to FIGS. 3-6 an alternative embodiment of the present invention is illustrated with the rotatable steering wheel rim 20 on the steering wheel assembly 10 and the non-rotatable center portion 25. In this embodiment, the visual display unit 30 is shown as a rather large rectangular or square display unit also affixed to an airbag module 40. However, in this embodiment, the visual display unit 30, shown in FIG. 3, is initially positioned in a somewhat aligned position parallel to the rim 20. In FIG. 4, the visual display unit 30 has been tilted to a position slightly facing an occupant or driver who would be sitting between the rim and the seat. In FIG. 5, the visual display unit 30 is shown fully rotated exposing the airbag module 40. As illustrated, the display unit 30 is affixed on each side of the airbag module 40 along a groove or channel 33. In this embodiment, the visual display unit 30 can be pivotally rotated as illustrated in FIG. 6 schematically showing the various positions of the display unit 30 relative to the airbag module 40. What is important about this embodiment is that the visual display unit 30 can be hinged to the channel or groove 33 of an airbag module 40 or directly attached to the non-rotatable portion 25 of the steering wheel assembly 10 so that the visual display unit 30 can be moved away from the airbag cover 44 so the visual display unit 30 will not impede the deployment of the airbag cushion during an event requiring deployment of the airbag. This is important in that the visual display unit does not obstruct or impede the pathway of the inflating airbag cushion which protects the driver by providing a cushion between the driver and the steering wheel assembly 10. As shown in FIG. 5, the visual display unit 30 rotated to a fully exposed position allowing for airbag deployment. As illustrated the visual display unit 30 is moving toward the 6 o'clock position, alternatively, the visual display unit 30 could be moved to a 12 o'clock position as long as the airbag is able to be safely deployed. It is preferred that the visual display unit 30 be provided with a pivoting hinge mechanism that attached directly to the side of the airbag module 40 or any non-rotating portion of the steering wheel assembly 10. The pivoting hinge mechanism can be a portion of the cover 44 that opens along a tear seam 42 while the visual display unit 30 moves with the cover 44.

In alternative embodiment, it is important to note that the visual display unit 30 can be provided with a touch screen display. The display gauges and other electronic features such as vehicle instrumentation gauges, satellite navigation system, phone communication and video displays can be viewed by the occupant or driver. These features are quite helpful in the use of autonomous vehicles. In that an autonomous vehicle would be driving and controlling maneuvering. The driver would occupy a position that would allow him or her to view a visual display unit, however, in emergency situations the visual display unit 30 would alert the driver to make necessary emergency adjustments if possible in a quick response time.

It is further noted, that in the use of these visual display units 30, it might be preferable that the visual display unit 30 have an auto-rotate view function that is responsive to gravitational forces. If such a visual display unit 30 were employed, the use of a non-rotating center portion becomes less necessary in that a standard vehicle rim could be employed with a visual display unit 30 and as the steering wheel rotates, the display image will maintain a horizontal or level view not rotating with the movement of the steering wheel rim. This alternative embodiment simplifies the construction of the steering wheel assembly 10 and allows the visual display unit 30 to be used with conventional steering wheel assemblies. The visual display unit 30 can be flexible, rigid or curved. As shown in the previous embodiments, it is important that the visual display unit 30 be adjustable similar to tiltable steering wheels. The driver or occupant may prefer the visual display unit 30 to be tilted slightly. This adjustment capability is provided while maintaining the ability of the visual display unit 30 to move either with the cover 44 upon breaking or to move away from the airbag cover 44 during deployment of the airbag cushion.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A steering wheel assembly comprises:
   a rotatable rim affixed to a center armature attached to a steering shaft configured to steer a vehicle, the rotatable rim being rotatable about a central axis of the steering shaft;
   a non-rotatable mounting assembly positioned spaced apart from and within a perimeter defined by the rotatable rim, wherein the rotatable rim is rotatable about the non-rotatable mounting assembly;
   an airbag module mounted onto and forming a part of the non-rotatable mounting assembly, the airbag module configured to deploy an inflatable airbag cushion between the rim and an occupant; and
   a visual display unit mounted to the non-rotatable mounting assembly and positioned within the perimeter of the rim, wherein the rotatable rim is rotatable about the visual display unit, and the visual display unit is non-rotatable about the central axis;

wherein upon deployment of the airbag cushion, the visual display unit does not impede the airbag cushion deployment, and wherein the visual display unit is attached to a hinged structure for allowing the visual display to rotate about a rotational axis transverse to the central axis, the hinged structure including a pair of guide grooves on the non-rotatable mounting assembly or on the airbag module and the visual display unit being movable along the guide grooves.

2. The steering wheel assembly of claim 1 wherein the visual display unit moves during an airbag cushion deployment.

3. The steering wheel assembly of claim 2 wherein the hinged structure is configured to pivot about said airbag module during deployment.

4. The steering wheel assembly of claim 1 wherein the visual display unit is attached to a cover affixed to the airbag module.

5. The steering wheel assembly of claim 4 wherein the airbag module has the cover open on deployment and the visual display unit moves with the cover.

6. The steering wheel assembly of claim 4 wherein the cover has a frangible opening that tears on deployment and the visual display unit is stationary and affixed to a fixed portion of the cover removed from the frangible opening.

7. The steering wheel assembly of claim 6 wherein the frangible opening of the cover is positioned along an upper portion or lower portion of the airbag module defined as centered at 12:00 o'clock or 6:00 o'clock position where 12:00 o'clock is an upper position and 6:00 o'clock is a lower position relative to the steering wheel assembly.

8. The steering wheel assembly of claim 1 wherein the visual display unit has a touch screen for controlling the visual display unit.

9. The steering wheel assembly of claim 1 wherein the visual display unit has a rigid display.

10. The steering wheel assembly of claim 1 wherein the visual display unit has a flexible touch screen display directly affixed to the airbag module.

11. The steering wheel assembly of claim 1 wherein the visual display unit is tiltably adjustable at a viewer's discretion.

12. The steering wheel assembly of claim 1 wherein the visual display unit is positioned relative to the rotatable rim above, at or below a plane defined by the perimeter of the rotatable rim.

13. The steering wheel assembly of claim 1 wherein the rotatable rim is spaced a distance from the airbag module and visual display unit to facilitate hand grip along 360 degrees of the perimeter of the rotatable rim.

14. The steering wheel assembly of claim 1 wherein the visual display unit is part of an autonomous vehicle drive system.

15. The steering wheel assembly of claim 1 wherein the visual display unit broadcasts incoming calls, text messages and video including satellite navigation systems.

* * * * *